Dec. 16, 1941.      W. H. PUGSLEY      2,266,332
AUTOMATIC SANDER FOR MOTOR VEHICLES
Filed Feb. 6, 1939      2 Sheets-Sheet 1

Inventor
WILLIAM H. PUGSLEY
By Chas. C. Reif
Fig.8.    Attorney

Dec. 16, 1941.  W. H. PUGSLEY  2,266,332
AUTOMATIC SANDER FOR MOTOR VEHICLES
Filed Feb. 6, 1939   2 Sheets-Sheet 2
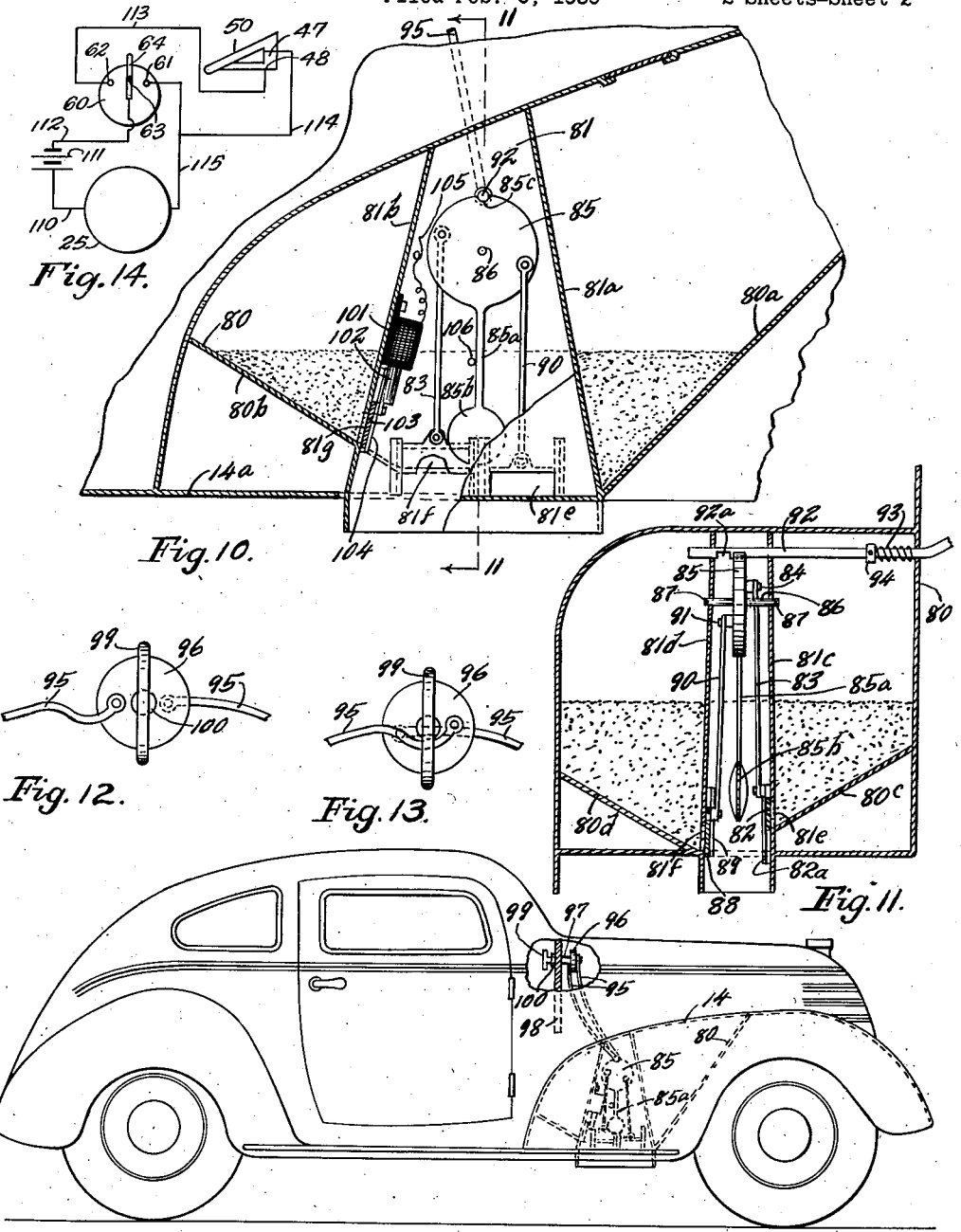
Inventor
WILLIAM H. PUGSLEY
By Chas. C. Reif
Attorney Patented Dec. 16, 1941

2,266,332

UNITED STATES PATENT OFFICE 2,266,332

AUTOMATIC SANDER FOR MOTOR VEHICLES

William H. Pugsley, Minneapolis, Minn., assignor of one-half to Samuel G. Storberg, St. Paul, Minn.

Application February 6, 1939, Serial No. 254,762

5 Claims. (Cl. 291—23)

This invention relates to a sanding device for vehicles. With the present large number of automotive vehicles some means for securing traction on slippery surfaces is almost essential. In the colder climates where icy streets and roads are encountered through quite a long season, such means is exceedingly desirable. Where the streets or roads are quite icy great wear occurs on the tires due to the wheels spinning on the ice. This is really unnecessary. In most cases increased traction is usually desirable when the vehicle is starting or stopping. It is desirable therefore, to have a sanding device which will be automatically operated at such times.

It is an object of this invention therefore, to have a sanding device for vehicles including means for discharging the sand where it will be engaged by the wheels together with automatic means for operating said device when the vehicle is starting or stopping or in other words, when the motion of the vehicle is being accelerated or decelerated.

It is a further object of the invention to provide a simple and convenient sanding device having means for propelling the sand to discharge the same beneath the wheels of the vehicle, the sand preferably being discharged toward the driven wheels.

It is still another object of the invention to provide a sanding device for vehicles including a container for the sand, means for discharging sand from the container toward the wheels of the vehicle, a motor for driving said means together with automatic control means for the motor constructed and arranged to be actuated by the acceleration or deceleration of the speed of said vehicle.

Another object of the invention is the provision of a sanding device having means for discharging the sand toward the wheels of the vehicle, a motor for driving said means together with both manually and automatic control means for said motor.

These and other objects and advantages of the invention will be fully set forth in the following description made in connection with the accompanying drawings in which like reference characters refer to similar parts throughout the several views and in which—

Fig. 8 is a view in elevation of a modified form of control device;

Fig. 9 is a view similar to Fig. 1 showing a modified form of sanding device, some parts being broken away and others shown in vertical section;

Fig. 10 is a view similar to Fig. 2 showing a modification;

Fig. 11 is a vertical section taken substantially on line 11—11 of Fig. 10 as indicated by the arrows;

Fig. 12 is a view in elevation of a portion of the manual control device used with the modification shown in Figs. 9, 10 and 11;

Fig. 13 is a view similar to Fig. 12 showing the parts in a different position; and Fig. 14 is a wiring diagram showing the control for the motor.

Figure 1:
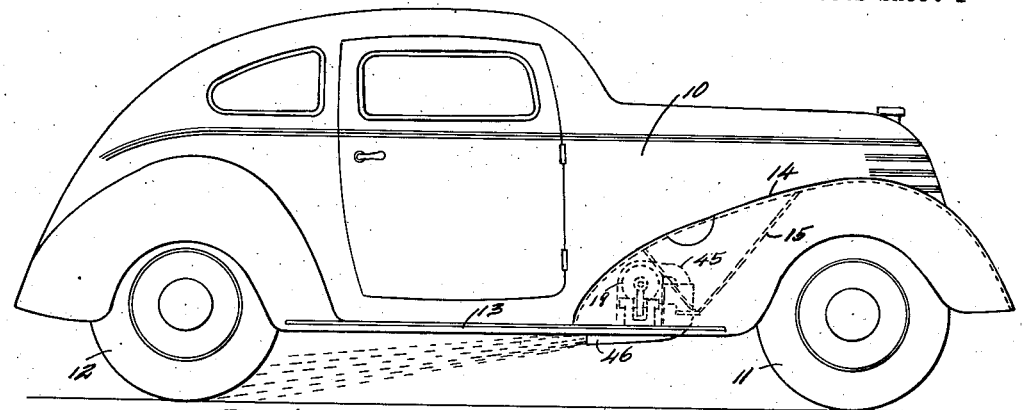
Fig. 1 is a view in side elevation of the vehicle, the sanding device being indicated thereon in dotted lines.
Figure 7:
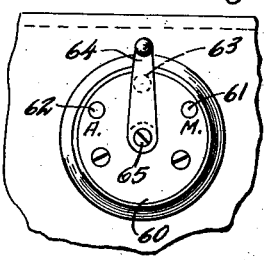
Fig. 7 is a view in front elevation as seen from the left of Fig. 6.
Figure 3:
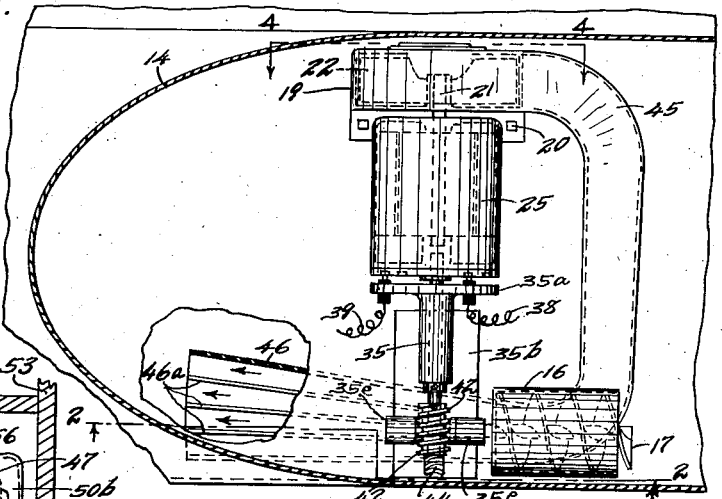
Fig. 3 is a horizontal section through the vehicle just above the sanding device, some parts being broken away and others shown in further horizontal section.
Figure 2:
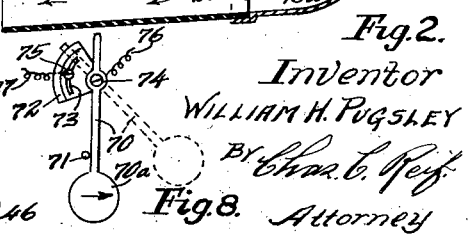
Fig. 2 is a vertical section taken substantially on line 2—2 of Fig. 3 as indicated by the arrows.

Referring to the drawings, particularly Figs. 1 to 7, in Fig. 1 a vehicle of the modern automotive type is shown of which it will only be necessary to mention the body 10, the front wheels 11, the rear wheels 12, the running board 13 and the front fenders or guards 14. In accordance with the present invention a receptacle 15 is formed within the fender 14, said receptacle having downwardly sloping ends as shown in Figs. 1 and 2. Receptacle 15 forms a container for sand and the same may be of the same width as fender 14. Receptacle 15 has an opening in its rear side through which projects a casing 16 shown as cylindrical in form having bearings in its ends for a shaft 18 which carries a helical conveyor 17. The front end of conveyor 17 projects slightly beyond the end of casing 16 into the receptacle 15. A floor 14a is provided within the fender 14 substantially in the same plane as the running board 13. A casing 19 has a flange 19a secured to the floor 14 by the screws 20. A shaft 21 is journalled in one side of casing 19 and has secured thereto within casing 19, a fan 22. Casing 19 has at one end a cover 19b having an offset circular flange 19c. A plate 23 is rotatably mounted in flange 19c and has therein a plurality of segmental openings 23a. Said openings are adapted to be moved into alignment or out of alignment with similar openings formed in the side of casing 19 so that more or less air may be admitted into said casing and to the fan 22. Shaft 21 forms the armature shaft of a motor 25. Said motor has an armature 25a and a rotating field 25b. Said motor also comprises a casing 25c shown as of cylindrical form to which field 25b is connected and with which it rotates. Said casing 25c has an end plate extending to a hub 25d in which one end of the armature shaft 21 is journalled. Hub 25d has a projection at the outer side of the casing 25c and is secured to a shaft 26 in any suitable manner as by pin 27. Contact rings 28 and 29 are carried in a disk 30 of insulating material which is of annular form and secured to the outer end of casing 25. Rings 28 and 29 are engaged respectively by brushes 31 and 32 carried in holders 33 and 34 respectively mounted in a circular plate 35a which is carried by the hub of a bearing bracket 35. Bracket 35 has a flange 35b secured to the floor 14a. Suitable conductors 36 and 37 connect rings 28 and 29 respectively with the field 25b. Other conductors 38 and 39 will extend to a suitable switch or control means for the motor. Motor 25 is generally of the type shown and may be the same as that illustrated in applicant's Patent No. 1,835,811, granted December 8, 1931.

A collar 40 is secured to shaft 26 at one end of bearing bracket 35 by any suitable means such as the set screw 41. A worm gear 42 is secured to shaft 26 by the set screw 43. Worm gear 42 meshes with a worm wheel gear 44 mounted on shaft 18 journalled in spaced bearings 35c upstanding from flange 35b. A conduit 45 is connected to the discharge opening in face casing 19, the same being curved at right angles to extend parallel to shaft 26 and again being bent substantially at a right angle to extend beneath the casing 16. Casing 16 has an opening 16a in the bottom thereof adapted to discharge into the conduit 45. A discharge spout or nozzle 46 is secured to the underside of floor 14a, the same communicating with the end of conduit 45 and flaring somewhat in width and depth toward its discharge end. Said plate 46 is shown as having a plurality of partitions 46a extending from top to bottom thereof.

Figure 6:
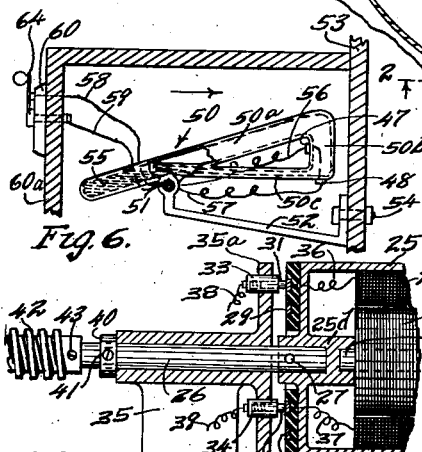
Fig. 6 is a vertical section through the dash and instrument board of the vehicle illustrating a control device used.
Figure 5:
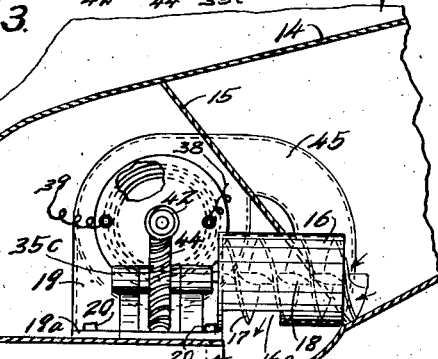
Fig. 5 is a partial vertical section through one end of the driving motor and attached parts.
Figure 4:
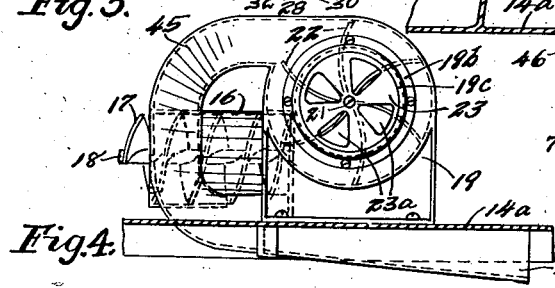
Fig. 4 is a vertical section taken substantially on line 4—4 of Fig. 3 as indicated by the arrows.

A control means for the motor 25 is provided and this will include a pair of contacts 47 and 48 which will be disposed in the circuit of motor 25 which includes conductors 38 and 39. A member 50 is pivotally mounted about a horizontal pivot 51 in a small bracket 52 which will be secured to the dash proper 53 of the automobile by a headed and nutted bolt 54. Member 50 comprises a top tubular portion 50a, the lower end of which is closed and said portion 50a is adapted to contain a quantity of mercury 55. The upper end of portion 50a communicates with a vertical portion 50b as shown in Fig. 6. This portion carries at the bottom thereof and at one side thereof the contacts 47 and 48. A smaller and tubular portion 50c extends from the bottom of portion 50b back into portion 50a. Conductors 56 and 57 extend to suitable contacts adjacent pivot 51 and other conductors 58 and 59 continue conductors 56 and 57 to a switch dial 60 mounted upon the instrument board 60a of the vehicle or automobile. Dial 60 has contacts 61 and 62 thereon adapted to be engaged by a contact 63 carried on a crank 64 pivoted by the pivot screw 65 to the center of dial 60. The contact 63 as shown in Fig. 6, is connected through member 65 with conductor 59 while contact 61 is connected to conductor 58.

In operation, sand which is dry and quite fluent, will be disposed in container 15. This sand will extend down into the front end portion of casing 16 to be engaged by the conveyor 17. The device is arranged for manual and automatic control. When in position for automatic operation, crank 64 will be moved to bring contact 63 into arrangement with contact 61 on the dial 60. In this position when the vehicle is moving forward and a stop is to be made so that the speed of the vehicle is decreased or decelerated the inertia of the mercury 55 in member 50 will move the same forwardly and upwardly in portion 50a so that it will drop into portion 50b. Contacts 47 and 48 will be connected through the body of mercury and this will close the circuit of motor 25. The mercury will pass slowly from portion 50b through portion 50c to the lower end of portion 50a and when enough has moved out of portion 50b to move out of engagement with contact 47, the motor circuit will be opened. The motor circuit being thus closed as the vehicle is coming to a stop, motor 25 is driven and drives fan 22 to direct a strong blast of air through conduit 45 and through the spout 46. At the same time the motor turns worm gear 42 and worm wheel gear 44, thus rotating conveyor 17 and moving some sand from container 15 through opening 16a into the conduit 46. This sand is forcibly projected by the air blast toward the rear wheels 12 as indicated in dotted lines in Fig. 1 so that said sand will be disposed or deposited under said wheels. The shutter 23 can be regulated to admit the desired amount of air to the fan 22. The discharge of sand will continue until motor 25 is stopped by the opening of its circuit as above described. Sand is therefore, placed beneath the wheels and particularly the driving wheels on the slippery surface just when it is needed. If delivery of sand is desired at other times as when the vehicle is starting, this can be accomplished by moving crank 64 to bring contact 63 into engagement with contact 62. This will close a circuit through the motor and motor 25 will be operated to discharge sand as above described, until crank 64 is again moved to open the motor circuit.

In Fig. 14 a wiring diagram is shown. Motor 25 is indicated and a conductor 110 extends from one lead or contact thereof to a suitable source of current indicated by battery 111. A conductor 112 extends from the other pole of battery 111 and is connected to the arm 64 of switch member 60. A conductor 113 extends from contact 62 of switch 60 to contact 48 of the inertia member 50. Another conductor 114 extends from the contact 47 of member 50 to and is connected to a conductor 115 extending from the other lead or contact of motor 25 to contact 61.

It will be seen that when arm 64 is moved to the right to bring contacts 61 and 63 into engagement that a circuit will be closed through conductors 112, arm 64 and conductors 115 and 110 through motor 25. This will constitute the manual operation. When arm 64 is moved to the left to bring contact 63 into engagement with contact 62 a circuit will be formed through conductor 112, arm 64, conductor 113 to contact 47 and from contact 48 through conductors 114 and 115 to the other side of motor 25. This circuit is open at contacts 47 and 48 and will only be closed by automatic operation of the mercury and member 50. The same circuit would apply when the pendulum device shown in Fig. 8 is used except that the contacts therein would replace the contacts of member 50.

In Fig. 8 another form of control for the motor is shown comprising a pendulum 70 having the weight 70a at its lower end. This pendulum will be mounted in a convenient place in the vehicle so as to hang vertically and movement in one direction will be prevented by a suitable pin 71. A switch block 72 is provided which will be made of insulating material and which will have a contact 73 disposed thereon. Contact 73 is shown as of arcuate form and concentric with the pivot member 74 of pendulum 70. Contact 73 may be shifted to different positions on block 72 by loosening or tightening its holding screw 75. Pendulum 70 has a portion above pivot 74 which will carry a contact plate adapted to engage contact strip 73. Suitable conductors 76 and 77 are connected to the contact on the pendulum and contact 73 respectively and will be included in the motor circuit.

With the described construction when the vehicle's motion is decelerated or the speed decreased in coming to a stop, pendulum 70 will swing as indicated in Fig. 8 and the contact thereon will engage contact 73 to close the motor circuit and cause the delivery of sand. The motor will be operated until the pendulum swings downwardly to separate the said contacts.

In referring to Figs. 9 to 13 a different form of mechanism is provided comprising a receptacle 80 formed within the fender 14 having downwardly converging bottom portions 80a and 80b. A central casing 81 extends through container 80 having sides 81a and 81b extending to portions 80a and 80b respectively. Casing 81 has sides or ends 81c and 81d extending between the sides 81a and 81b and extending in contact with the downwardly sloping bottom portions 80c and 80d of receptacle 80. The end portion 81c has an opening 81e adjacent the bottom portion 80c and this opening is normally covered by a slidable valve plate 82 movable in guides 82a on the inner side of end portion 81c. Valve plate 82 is connected by a link 83 to a pin 84 projecting from one side of a disk 82 oscillatably mounted on a pin 86 extending through and between end portions 81c and 81d and held from movement by cotter pins 87. End portion 81d has an opening 81f adjacent bottom portion 80d, which opening is normally closed by a valve plate 88 movable in guides 89 on the inner side of end portion 81d. Valve plate 88 is connected by a link 90 to a pin 91 projecting from the side of disk 85 opposite to that from which pin 84 projects. A pendulum 85a having the weight 85b at its lower end is centrally connected to the bottom of disk 85. Disk 85 has a semi-cylindrical groove 85c in its upper portion into which a rod 92 may engage. Rod 92 is normally held in position within said groove by a coiled compression spring 93 extending thereabout and engaging one wall of receptacle 80 at one end. The other end of spring 93 engages a collar 94 pinned or otherwise secured to rod 92. Rod 92 has formed on its underside adjacent disk 85, a slot 92a which may be brought into alignment with disk 85 to permit oscillation of said disk by endwise movement of rod 92. Rod 92 is adapted to be moved endwise against the tension of spring 93 by flexible or semi-flexible members 95 secured at opposite sides of a small disk 96 mounted on a shaft 97 in the instrument board 98 of the automobile, said shaft having a T-shaped handle 99 thereon at the front of said instrument board. A collar 100 is also shown on said shaft engaging instrument board 98. A solenoid 101 is mounted on the inner side of side portion 81b, the same having a core plunger 102 secured to a valve plate 103 normally closing an opening 81g in side 81b adjacent the bottom portion 80b. Valve plate 103 is movable in suitable guides 104. A suitable conductor 105 is connected to one end of the winding of the solenoid 101 and will extend to a suitable manual switch (not shown). The other end of said winding will preferably be grounded by being connected to the frame of said vehicle. It will be noted that the bottom of casing 81 extends below the bottom 14a of the fender 15 and has an open lower end. A pin 106 engages one side of pendulum 85a and prevents motion thereof in one direction.

In operation with rod 92 in position with slot 92a aligned with disk 85 the device is set for automatic operation. Fluent sand will be disposed in the container 80 and will be in position against portions 81c, 81d and 81b to move through openings 81e, 81f and 81g if permitted. As the vehicle has its speed decreased in coming to a stop, pendulum 85a will swing to the right as shown in Fig. 10, about pivot 86. This motion will depress link 83 and lift link 90 from the position shown in Fig. 11. Such movement will move valve plates 82 and 88 to open position. Sand will flow through the openings 81e and 81f and be discharged downwardly to the bottom of casing 81. This sand will be deposited in line with the wheel so that it will be engaged by the wheels. If desired, the sand could be deposited into a spout similar to the spout 46 to be projected under the wheels. When the vehicle stops and pendulum 85a swings back to vertical and stationary position valve plates 82 and 88 will be moved to closed position. To prevent the delivery of sand when the roads are not slippery and no sand is required the rod 92 is permitted to pass into the slot or notch 85c to prevent oscillation of disk 85 and of pendulum 85a. Rod 92 can be moved by turning handle 99. This moves the members 95 from the position shown in Fig. 12 to the position shown in Fig. 13. Said members and disk 96 are locked in dead center position as shown in Fig. 13 and at this time slot 92a is aligned with disk 85. Manual discharge of sand when desired, may be accomplished by closing a switch controlling solenoid 101. This will move plunger 102 into the coil of solenoid and raise and open valve plate 103. This will permit delivery of sand through opening 81g. Plunger 102 and valve plate 103 may be returned to normal position with the valve closed by gravity or by a spring not shown.

From the above description it will be seen that I have provided a simple and efficient sand discharging or distributing device. The device can be conveniently mounted in a comparatively small space in the vehicle. The device is arranged either for automatic or for manual control. The sand is delivered where it will be most efficiently used and it is delivered just when it is most needed. By the use of the device a much improved control can be had over the vehicle on slippery roads or streets and a great deal of unnecessary wear on the tires will be prevented. The device is mounted so that it is not in view and it in no way detracts from the appearance of the vehicle. The current for the driving motor can be supplied from the automobile battery. The device is very compact and the same can be readily installed either on new cars or on cars already in service. It is apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A sanding device for delivering sand in front of the wheels of a vehicle having in combination, a hopper for said sand, a discharge conduit for sand spaced a comparatively great distance in front of and directed toward a rear wheel of said vehicle, a motor, feeding means for feeding sand from said hopper to said discharge conduit disposed at one end of said motor, means extending at one end of and driven by said motor for driving said feeding means, a fan at the opposite end of said motor and means extending from said opposite end of said motor, driven thereby and rotatable independently of said last mentioned means for driving said fan.

2. A sanding device for delivering sand in front of the wheels of a vehicle having in combination, a hopper having a bottom sloping toward one end, a discharge conduit adjacent said bottom, a feeding means comprising a helical member, one end of which extends a short distance into said hopper adjacent said bottom and being disposed over said conduit to discharge by gravity thereinto, a motor, means forming an operative part of the same extending from one end of said motor and connected to said feeding means for driving the same, a fan disposed at the other end of said motor, means extending from said other end of said motor and forming an operative part of the same and rotatable independently of said last mentioned means for driving said fan, whereby said feeding means may be retarded without affecting said fan.

3. The combination with the running board of an automobile and a front fender extending upwardly and forwardly therefrom, of a hopper disposed under said fender, an extension of said running board disposed under said fender, a discharge conduit for sand disposed beneath said running board adjacent said fender and a front wheel of said vehicle and having an open rear end directed toward and spaced a comparatively long distance from the rear wheel of said automobile, a feeding means disposed over said conduit and arranged to discharge thereinto by gravity, said feeding means extending into said hopper, a motor supported upon said extension under said fender, means extending from one end of said motor and driven thereby for driving said feeding means, a fan disposed at the other end of said motor, means extending from said other end of said motor, driven thereby and rotatable independently of said last mentioned means for driving said fan, a casing for said fan and conduit connected thereto and supported upon said extension, said conduit extending to and being connected to said discharge conduit for directing air therethrough for discharging said sand toward and under said rear wheel.

4. A sanding device for vehicles having in combination, a container for sand, means for feeding sand from said container, a motor having a rotatable armature shaft and a rotatable field which can rotate independently of said armature shaft, means for discharging said sand toward the wheels of said vehicle so as to be disposed thereunder, a member projecting from one end of said motor and connected to said field for driving one of said last two mentioned means, a member projecting from the other end of said motor and connected to said armature shaft for driving the other of said last two mentioned means and means actuated by the motion of said vehicle for controlling said motor.

5. A sanding device for delivering sand in front of the wheels of a vehicle having in combination, a motor comprising a rotatable armature shaft and a rotatable field rotatable independently of said armature shaft, a reservoir for holding sand having a sloping bottom, means extending from one end of said motor connected to and driven from said field, means connected to said member and extending adjacent said sloping bottom for feeding sand therefrom, a discharge means spaced a comparatively long distance in front of and directed toward a rear wheel of said vehicles, a fan disposed at the opposite side of said motor and a member projecting from the opposite side of said motor and connected to said armature shaft for driving said fan and delivering air to said discharge means for propelling sand fed by said first mentioned means toward said rear wheels.

WILLIAM H. PUGSLEY.